United States Patent [19]

Ehresman et al.

[11] 4,091,456

[45] May 23, 1978

[54] ROM CONTROLLED COMMUNICATION SYSTEM

[75] Inventors: Virgil Alphonse Ehresman; George W. McIntyre, both of Salt Lake City, Utah

[73] Assignee: Sperry Rand Corporation, New York, N.Y.

[21] Appl. No.: 719,767

[22] Filed: Sep. 2, 1976

[51] Int. Cl.² .................................................. G06F 3/05

[52] U.S. Cl. ...................................................... 364/900

[58] Field of Search ............... 340/172.5; 364/900 MS

[56] References Cited

U.S. PATENT DOCUMENTS

| | | | |
|---|---|---|---|
| 3,281,793 | 10/1966 | Oeters et al. | 340/172.5 |
| 3,846,762 | 11/1974 | Gregory et al. | 340/172.5 |
| 3,922,643 | 11/1975 | Poole | 340/172.5 |

*Primary Examiner*—Raulfe B. Zache
*Attorney, Agent, or Firm*—John R. Flanagan; Marshall M. Truex

[57] ABSTRACT

A system in which a plurality of analog information sources appearing on a plurality of multiplexer channels are selectively scanned under control of a read only memory. The analog information is converted to digital information having a word length also determined by the read only memory and put in a serial stream of digital information prior to transmission.

12 Claims, 3 Drawing Figures

| ADDRESSED WORD | | | | |
|---|---|---|---|---|
| $B_0$ | $B_1$, $B_2$ | $B_3$ — $B_5$ | $B_6$ — $B_9$ | $B_{10}$ — $B_{15}$ |
| A+D | MUX SELECT | CHANNEL SELECT | SET WIDTH COUNTER | NEXT ADDRESS |
| ANALOG OR DIGITAL | SELECT 1 OF 3 MULTIPLEXERS | SELECT 1 OF 8 MULTIPLEXER CHANNELS | SELECT NUMBER OF BITS PER WORD, IE, SET WIDTH COUNTER | NEXT ADDRESS |

ROM CONTROLLED COMMUNICATION SYSTEM

BACKGROUND OF THE INVENTION

In communication systems it is often desirable to convert continuous wave or analog information to digital form prior to transmission. The advantage of transmitting information in digital form is that it can be transmitted on a single channel regardless of the frequency characteristics of its original form. Thus, where there is a plurality of analog information, sources of each of which might require a separate channel for transmission, conversion of it to digital form permits its transmission on a single channel with the attendant advantages of savings in modulation equipment.

Naturally, where there are more than one source of information to be transmitted, some means for time sharing the single channel of transmission must be provided. Thus, where there are a plurality of sources of information, each source is transmitted in time sequence under some type of multiplexer control. If the sources of information are continuous, then each may share the channel during time slots. Further, it may be desirable that certain ones of the sources of information have more time slots for transmission than others dependent on the type of information to be transmitted.

The present invention contemplates a multiplexing system where a plurality of sources of continuous wave information is constantly present at the inputs of a multiplexer. Under the control of a read only memory, each channel of the multiplexer is sampled in a sequence and at a rate under the control of the program in a read only memory. The analog information of each sampled multiplexer channel is converted to digital information and then introduced to the transmit stream. The word length, i.e., the number of bits put into the transmit stream is also controlled by the read only memory. Thus, control of the word length makes for more efficient transmission, i.e., more efficient use of the bandwidth. Since power required to transmit is a function of bandwidth and the word length, i.e., number of bits required to transmit certain types of information is less than others, selective compression of words prior to transmission aids in conservation of transmission energy.

The present invention also includes means to place information originating in digital form into the transmit data stream. Under read only memory control, time slots normally allotted to data from the multiplexer are assigned to the digital information whose word length is also controlled by the read only memory.

OBJECTS OF THE INVENTION

It is an object of the present invention to provide a multiplexing system for selectively and sequentially placing a plurality of information sources into a data stream for transmission over a single channel.

It is another object of the present invention to provide a system wherein multiplexed, continuous wave sources are digitized into variable word lengths prior to transmission over a single channel.

Another object of the present invention is to provide a multiplexer which is scanned under the control of a read only memory and whose continuous wave outputs are digitized into words whose lengths are controlled by the read only memory prior to transmission over a single channel.

A further object of the present invention is to provide a multiplexer having a plurality of continuous wave inputs on a plurality of channels which are scanned under the control of a read only memory.

Yet another object of the present invention is to provide digital data originating as digital data or digitized from analog data for transmission whose word lengths are controlled by a read only memory.

Other objects and many of the attendant advantages of this invention will become apparent with reading the following description in conjunction with the accompanying drawings.

DESCRIPTION OF THE INVENTION

Figures 1, 3:
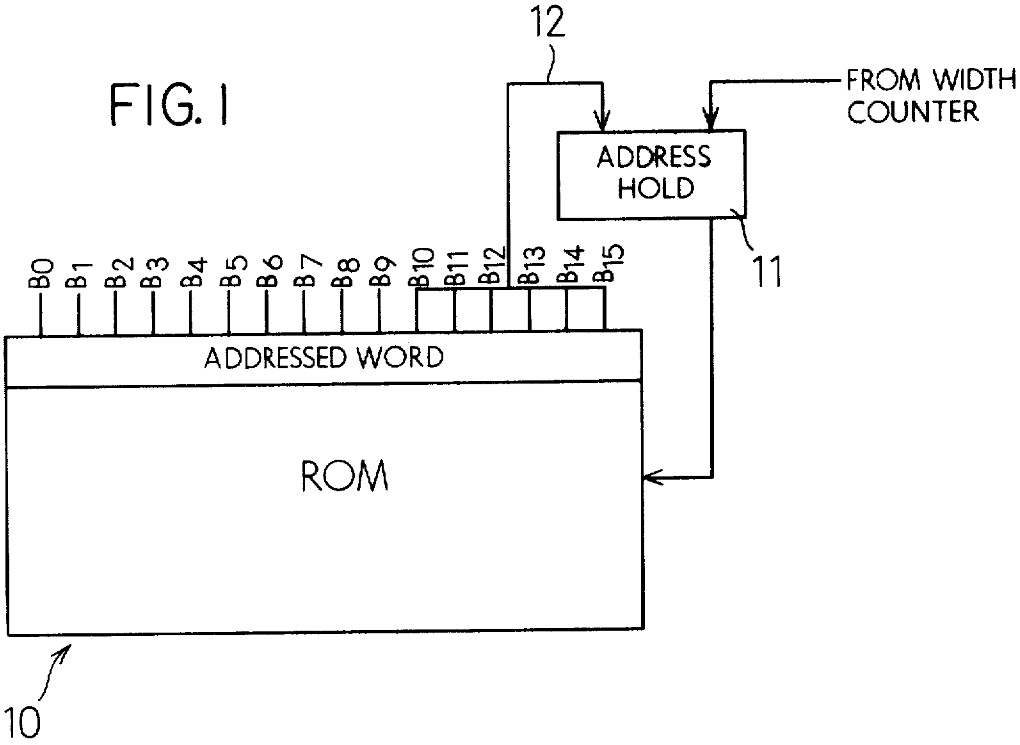
FIG. 1 is a block diagram of a preferred embodiment of the present invention.
FIG. 3 is a table showing the function of the bits of the words at each addressed location in the read only memory of FIG. 1.

Referring to FIG. 1, there is shown a read only memory 10 hereinafter referred to as ROM 10. ROM 10 has an unspecified number of memory locations with each location containing a word of 16 bits. It should be noted that a 16 bit word is used for purposes of explanation, and the words may have more or fewer bits as circumstances require. The ADDRESSED WORD which is shown at the top of ROM 10 may actually be any place in memory is shown as having 16 leads $B_0$ $B_{15}$, each representing a bit of the addressed word. While it may actually be contained within ROM 10, an address hold register 11 is shown separately having a lead or bus 12 connected to the leads representing $B_{10}$ to $B_{15}$ which is the address of the next word to be addressed. As each word in memory is addressed, the address of the next word to be addressed which is represented by bits $B_{10}$ to $B_{15}$ of the addressed word is transferred and held in address hold register 11 until at the end of a sequence, it is used to address the next word.

ROM 10 is conventional and is permanently programmed in accordance with any desired routine. When the routine is to be changed, the ROM is replaced by another preprogrammed ROM. Since the ROM may be a plug in panel or circuit board, change of program routine is accomplished simply by changing circuit boards.

Figure 2:
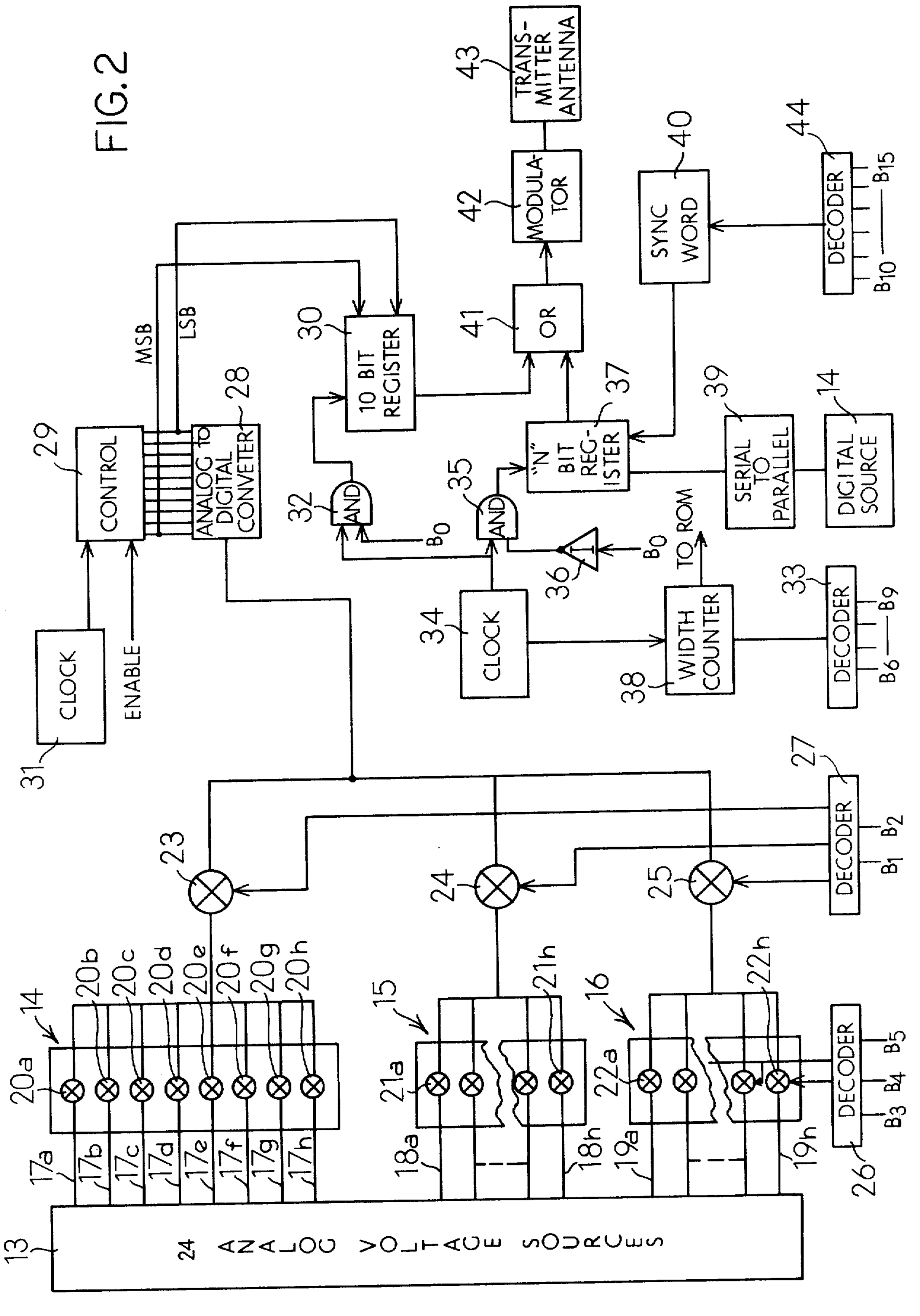
FIG. 2 shows in detail the analog to digital conversion of FIG. 1.

Referring to FIG. 2, there is shown in block diagram form a ROM controlled multiplexing system for providing data in digital form in a serial data stream prior to transmission over a single channel. The system may, for example, be airborne coding data for transmission to a ground base or other airborne receiver.

Block 13 represents a plurality of analog or continuous wave voltage sources. These sources are information bearing voltages which may originate in various sensors aboard the aircraft. The information may be of any type, e.g., temperature, altitude, position, audio intelligence, etc.

Each of these sources is connected to one of multiplexer units 14, 15 and 16.

Each multiplexer unit comprises eight channels although the number of channels could be more if desired. In addition, the number of multiplexer units could also be increased without affecting the operation of the present invention.

Multiplexer unit 14 comprises eight channels 17*a* through 17*h*, and each channel 17*a* through 17*h* has a switch, e.g., a transistor switch 20*a* through 20*h*, respectively. Each of the channels 17*a* through 17*h* is connected through a switch, e.g., a transistor switch 23 to analog to digital converter circuit 28.

Multiplexer unit 15 also comprises eight channels 18*a* through 18*h* connected to switch 24 through switches 21*a* through 21*h*, respectively.

Multiplexer unit 16 also comprises eight channels 19*a* through 19*h* connected to switch 25 via switches 22*a* through 22*h*.

Multiplexer units 15 and 16 are shown partially in the interest of brevity.

Each channel of each multiplexer unit is connected to one of 24 analog or continuous wave sources represented as being contained in block 13. These sources may be fast or slow varying, i.e., some may contain more information per unit time than others. Thus, in a manner to be explained more fully hereinbelow, some channels must be sampled more often than others to provide adequate information transmission.

Each of the channel switches 20*a* through 20*h*, 21*a* through 21*h* and 22*a* through 22*h* are connected to a decoder 26. Decoder 26 receives inputs from ROM 10 representative of bits $B_3$, $B_4$ and $B_5$ of the present addressed word in ROM 10. As can be seen by reference to FIG. 3, these bits are used to select a channel in each of the multiplexer units 14, 15 and 16 by turning on a particular channel switch in each of the multiplexer units. The particular switch of each multiplexer unit turned on is determined by the three bit code of the addressed word of the ROM 10. The decoder 26 contains conventional logic for accomplishing the foregoing. The bit combination of $B_3$, $B_4$ and $B_5$ which turns off a switch in each multiplexer unit 14, 15 and 16 is predetermined by the program in the ROM 10. For example, a bit combination of 001 may turn on switches 20*h*, 21*h* and 22*h* or any other predetermined combination of switches.

The analog voltage, however, which reaches analog to digital converter circuit 28 from a multiplexer unit depends on which of the switches 23, 24 or 25 is turned on. This is determined by the program in the ROM 10.

A decoder 27 has outputs connected to each of the switches 23, 24 and 25. Decoder 27 is connected to receive as inputs the bits of the addressed word designated by $B_1$ and $B_2$. Through conventional logic in the decoder 27, these two bits select one of the switches 23, 24 or 25 for turn on.

Thus, with a particular channel switch of each multiplexer units 14, 15 and 16 turned on, the analog voltage of a particular multiplexer unit which reaches the analog to digital converter circuit 28 is determined by the active states of switches 23, 24 and 25.

For each addressed word of the ROM, a different analog voltage is input to the analog to digital converter circuit 28. The particular sequence or order in which each analog voltage is sampled is determined by the program in the ROM 10. The program may call for sampling each channel in turn or for sampling channels in different sequences.

For example, some channels may be sampled more often than others. Also, multiplexer unit 14, 15 or 16 may serve as a submultiplexer. In the case where multiplexer unit 16 serves as a submultiplexer, the first of its channels may be sampled after all 16 channels of multiplexer units 14 and 15 have been sampled. Then after all the first 16 channels have been sampled, the next channel of the multiplexer unit is sampled, etc. The order and number of times each channel is sampled is dependent on prior knowledge of the type of analog signals, and the ROM is programmed using this knowledge. The order, etc., of sampling may be changed or varied simply by using a different read only memory programmed in a suitable manner.

The analog to digital converter circuit samples discrete levels of its analog input and compares it to a digital reference to provide a digital word having a predetermined number of bits, e.g., 10 bits representative of its analog input which contains the same information albeit in digital form which its analog input contained. The analog to digital converter circuit 28 contains a register from which the bits are selectively set by the control and the clock source 31 into a 10 bit register if control 29 is enabled, e.g., by the ROM bit $B_0$.

The clock source 31 is much faster than the system clock so that all bits are transferred to the 10 bit register before the system clock begins to clock them into the data stream.

An AND gate 32 has its output connected to 10 bit register 30. The AND gate 32 has one input from system clock 34 and a second input namely the $B_0$ bit from the addressed word in ROM 10. As may be seen from FIG. 3, $B_0$ is determinative of whether the digital information in the ten bit register 30 or the "*n*" bit register 37 is put in the data stream. As will be explained more fully hereinbelow, if bit $B_0$ is a 1, the data from the 10 bit register 30 is put in the data stream; whereas if bit $B_0$ is a 0, the data in the "*n*" bit register is put in the data stream.

The digital source of information, i.e., information originating in digital or discrete form is represented by block 14. This information may be a computer output, a truly digital word or simply an indication of a switch on condition if it is discrete, i.e., an unvarying high.

If there are several sources of information originating in digital or discrete, it may be multiplexed in a manner discussed with reference to the analog sources. For purposes of simplicity, the digital source will be considered as coming in serially over one channel. This information is converted and passed through a serial to parallel converter and parallel loaded into "*n*" bit register 37. The "*n*" bit register 37 is so named since it may inherently contain a large number of bits.

An AND gate has its ouput connected to "*n*" bit register 37.

A system clock source provides one input to AND gate 35 while bit $B_0$ is applied as the second input to AND gate 35 via inverter 36.

The outputs of 10 bit register 30 and "*n*" bit register 37 are connected through OR gate 41 to modulator 42 and thence to a transmitter and antenna 43.

The system clock 34 is connected to a width counter 38. An output from ROM 10 provides another input to width counter 38 to set the count therein in accordance with a preset count in the addressed word of the ROM 10.

As seen from FIG. 3, bits $B_6$ through $B_9$ are used to set the width counter 38 which, as will be seen, determines the number of bits per word put into the transmit data stream from 10 bit register 30 or "*n*" bit register 37. The bits $B_6$ through $B_9$ are applied to width counter 38 and in a well known manner set the count therein. The width counter 38 which is basically a down counter begins to clock down at the rate of the system clock; and when it reaches a zero count, a signal is applied to the address hold register 11 of ROM 10 to cause the address of the next memory location to become the present addressed word which causes another signal to be processed.

Now, during the time interval the width counter 38 is counting down from its preset count, either ten bit register 30 or "$n$" bit register 37 is serially clocking bits into the data stream at the rate of the system clock 34.

If bit $B_0$ is a 1, AND gate 32 is gated and clocks out to OR gate 41 all or a portion of the 10 bits in 10 bit register 30 dependent on the number set in the width counter 38.

If bit $B_0$ is a 0, AND gate 35 is gated and clocks out a number of bits in "$n$" bit register 37 to OR gate 41 dependent on the number set in the width counter 38.

When the width counter 38 reaches zero, then no more bits are clocked out from either the 10 bit register 30 or "$n$" bit register 37. These registers are then cleared. Also, the event of width counter 38 reaching zero causes the next word in ROM 10 to be addressed.

Synch word register 40 which is a pre-wired device for inserting a synch word having a predetermined number of bits at the beginning of a sequence. Each time the synch word appears, the sequence is repeated and is inserted in the data stream. This is useful for identifying the beginning or end of a sequence or format. The synch word is a digital word, selected by a predetermined bit code appearing in the next channel portion of the ROM 10 word via decoder 44; and when it appears, the synch word register 40 is forwarded to OR gate 41 via "$n$" bit register 37 using clock 34. The synch word occurs one time each ROM 10 pass, marking the beginning or end of the next address chain. It should be noted that the synch word is complemented at the beginning of each frame to increase the probability of frame synch.

The ROM 10 may be comprised of several distinct read only memories for changing sequences according to a preconceived program by causing a distinct memory to be referenced once for each pass ($n$ reads) of another memory. In this manner, a sub-channel group of slowly changing signals is multiplexed into the normal channel data stream at a sub-commutation rate of one channel per frame. Of course, ROM's may be changed at will to substitute different programs and routines for different known signal conditions.

The foregoing described system is basically a communication coding system wherein coding into digital form permits use of a single channel. In addition, the ability to control the number of bits per word actually transmitted makes for a more efficient system inasmuch as the spectrum or band pass required for a fewer bit word is less than for a word of more bits. This is an energy saving device because a smaller band width with consequent savings in transmission power is required for the fewer number of bits.

While the foregoing description is of a specific embodiment, it should be noted that other modifications thereof will occur to those skilled in the art and that no limitations should be placed on the present invention other than those appearing in the appended claims.

What is claimed is:

1. A system for providing a digital output stream for transmission over a single channel, comprising in combination:

multiplexer means;

said multiplexer means having a plurality of channels each having a continuous information wave on its input;

first means for sampling each output from each of said channels in a predetermined sequence wherein sampling of certain ones of said channels may occur more often than the sampling of other ones of said channels;

second means connected to said multiplexer means for converting the sampled continuous wave to a digital output having a predetermined number of bits;

first register means connected to said second means for storing said digital output;

third means connected to said register means providing said digital output in a serial data stream as an output.

2. A system according to claim 1 including:

a source of digital information;

second register means connected to said source of digital information and said third means;

said first means associated with said second register means for assigning a sample time to said second register means to insert said digital information in said data stream instead of the converted digital information from said second means.

3. A system according to claim 2 including:

fifth means under the control of said first means for controlling the number of bits put into the data stream from each of said first and second registers.

4. A system according to claim 3 wherein said multiplexer means comprises:

a plurality of sets of submultiplexers;

each of said submultiplexers having a plurality of channels;

a multiplexer connected to said channels of each set of submultiplexers;

each of said sets of submultiplexers including switch means in its respective channel and each of said multiplexers including switch means whereby when one of said multiplexer switch means is turned on and one of said submultiplexer switch means is turned on the switched multiplexer passes data via the switched submultiplexer channel.

5. A system according to claim 4 wherein said first means comprises:

a read only memory programmed in a predetermined manner according to a desired routine;

each addressed word of said read only memory containing bits or groups of bits for performing a desired control function.

6. A system according to claim 5 further including:

first decoder means connected between said read only memory and said multiplexer switches for turning on one of said multiplexer switches in reponse to a particular two bit combination in said addressed word;

second decoder means connected between said read only memory and said switches in each channel of said sets of submultiplexer for turning on a switch in a selected channel in each of said sets of multiplexers whereby said switched multiplexer passes information via the switched channel of its respective submultiplexer.

7. A system according to claim 6 wherein said second means comprises:

an analog to digital converter connected to receive the sampled continuous wave output from said selected multiplexer and said selected channel of its associated submultiplexer for converting said sampled output to a predetermined number of bits;

control means for loading said bits into said first register prior to the next word being addressed in said read only memory.

8. A system according to claim 7 wherein said fifth means comprises:

a down counter;

a clock source connected to said down counter for counting said down counter to zero;

third decoder means connecting said counter to said read only memory for inserting four bits representative of a predetermined word width of said addressed word into said counter.

9. A system according to claim 8 further including:

sixth means connected to said first and second register means and said clock source for gating a number of bits from said first or second register means into the data stream dependent on the count in said down counter.

10. A system according to claim 9 further including:

seventh means connecting said down counter to said read only memory to cause the next memory location therein to be addressed in response to said down counter reaching a count of zero.

11. A system according to claim 10 wherein said sixth means comprises:

a first AND gate connected to said first register means;

a second AND gate connected to said second register means;

said clock source connected as a first input to each of said AND gates;

connector means connecting said read only memory as a second input to each of said AND gates to enable said first or second AND gate in response to the status of a bit in the addressed location of said read only memory whereby said first or second register means provides bits into the data stream during the time said down counter is counting down to zero at a rate equal to the rate of said clock source and dependent on which of said first and second AND gates are enabled.

12. A system according to claim 11 further including:

eighth means connected to said second register means and under control of said read only memory for inserting a synch word in the data stream at the beginning of each predetermined program;

said eighth means responsive to a particular bit arrangement appearing in the address position of the addressed word of said read only memory.

* * * * *